(12) United States Patent
Rigobert et al.

(10) Patent No.: US 9,099,715 B2
(45) Date of Patent: Aug. 4, 2015

(54) SAFETY DEVICE FOR A SEALED ACCUMULATOR

(75) Inventors: Gérard Rigobert, Fargues St Hilaire (FR); Luc Mermillod-Blondin, Saint Jean de Sixt (FR); Florian Gaulet, Villenave d'Ornon (FR)

(73) Assignee: SAFT, Bagnolet (FR)

( * ) Notice: Subject to any disclaimer, the term of this patent is extended or adjusted under 35 U.S.C. 154(b) by 255 days.

(21) Appl. No.: 13/538,012

(22) Filed: Jun. 29, 2012

(65) Prior Publication Data

US 2013/0004809 A1    Jan. 3, 2013

(30) Foreign Application Priority Data

Jul. 1, 2011 (FR) ...................................... 11 55972

(51) Int. Cl.
H01M 2/12       (2006.01)
H01M 10/0525    (2010.01)

(52) U.S. Cl.
CPC .............. *H01M 2/1241* (2013.01); *H01M 2/12* (2013.01); *H01M 2/1223* (2013.01); *H01M 10/0525* (2013.01); *Y10T 29/49108* (2015.01)

(58) Field of Classification Search
CPC .... H01M 2/12; H01M 2/1223; H01M 2/1241
USPC ......................................................... 429/53
See application file for complete search history.

(56) References Cited

U.S. PATENT DOCUMENTS

| 2006/0051665 A1* | 3/2006 | Rigobert et al. ............... 429/179 |
| 2011/0123845 A1* | 5/2011 | Kusama et al. .................. 429/56 |
| 2011/0223449 A1* | 9/2011 | Rigobert et al. ................. 429/56 |

FOREIGN PATENT DOCUMENTS

| EP | 1 126 534 A1 | 8/2001 |
| EP | 2 270 899 A1 | 1/2011 |
| JP | 11-329402 A  | 11/1999 |

* cited by examiner

*Primary Examiner* — Jane Rhee
(74) *Attorney, Agent, or Firm* — Sughrue Mion, PLLC

(57) ABSTRACT

A sealed accumulator container (2) intended to contain an electrochemical bundle (9), the container comprising a wall forming a bottom (3) in an electrically conducting material comprising:
 a peripheral portion (3a),
 a cap (3c),
 an embrittled portion (3b) delimiting the cap, joining the peripheral portion to the cap, adapted so as to break upon overpressure inside the container,
 in which container is positioned an electrically conducting deformable membrane (10) electrically connecting electrodes of same polarity of an electrochemical bundle to the cap,
 and in which container, overpressure causes deformation of the membrane, this deformation causing failure of the embrittled portion.

17 Claims, 7 Drawing Sheets

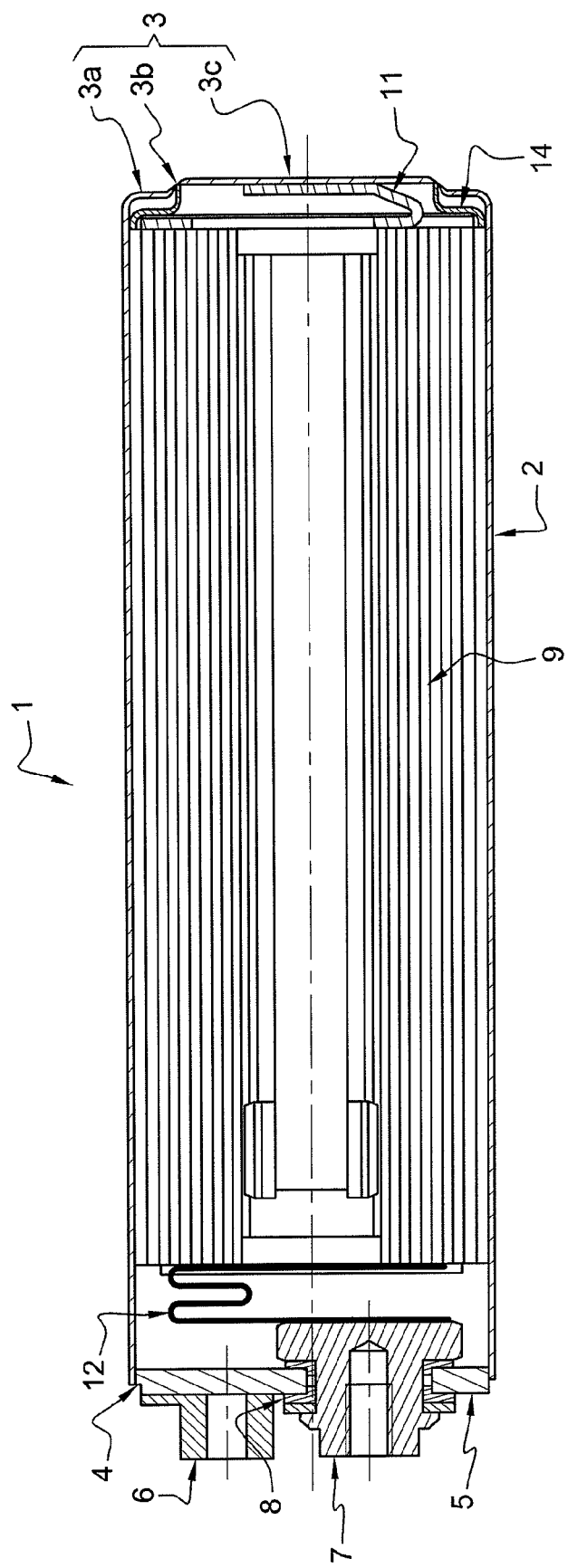

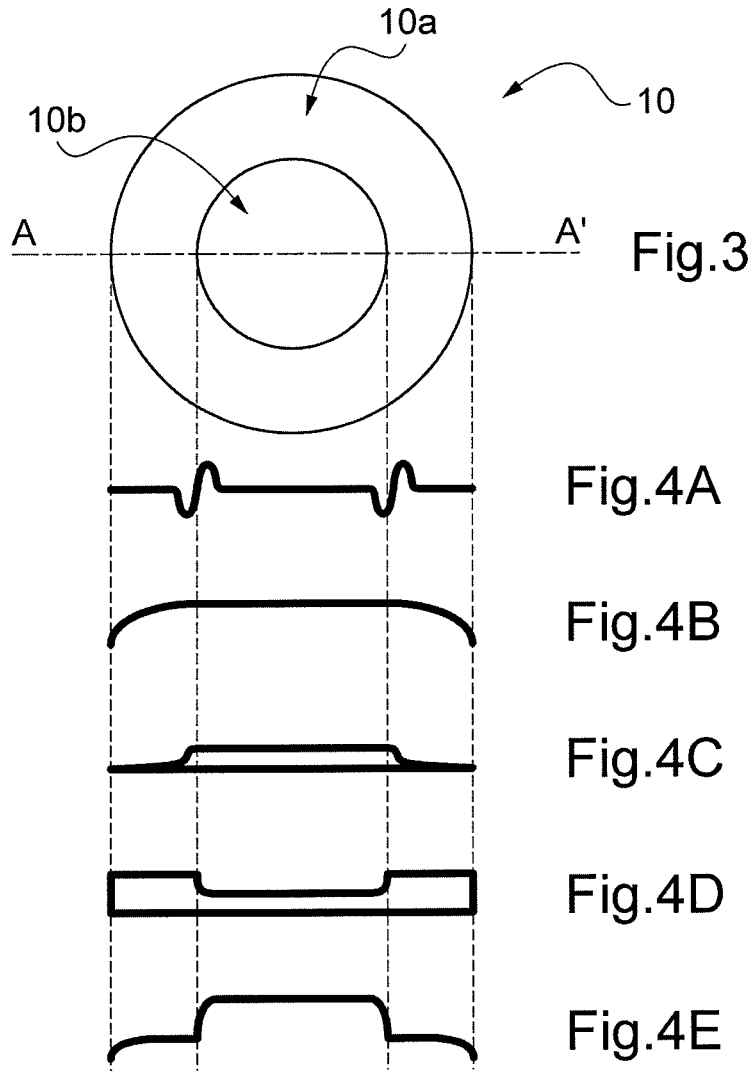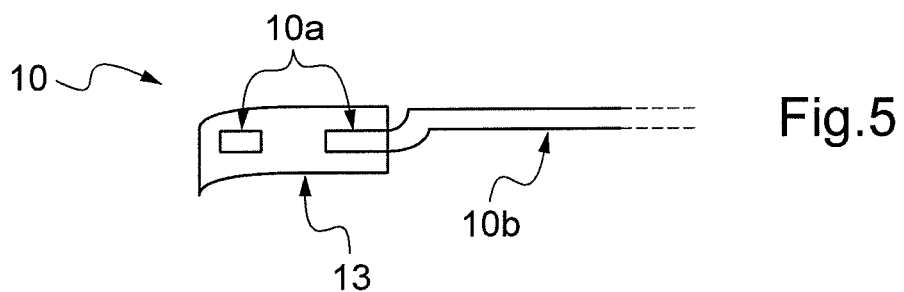

SAFETY DEVICE FOR A SEALED ACCUMULATOR

TECHNICAL FIELD

The present invention relates to the field of safety devices for sealed accumulators, in particular accumulators of the lithium-ion type.

PRIOR ART

A sealed accumulator or a sealed electrochemical generator (both of these terms being equivalent, the term of accumulator will be used in the present description), in a way known per se, comprises a container containing an electrochemical bundle, said bundle includes an alternation of positive and negative electrodes providing a framework for separators impregnated with electrolyte. Each electrode consists of a metal current collector supporting on at least one of its faces an electrochemically active material. The electrode is electrically connected to a current output terminal which ensures electric continuity between the electrode and the outer application with which the accumulator is associated. The bundle of electrodes is positioned in a container sealably closed by a lid.

The use of a sealed accumulator outside rated conditions, such as for example during an accidental overload, a short circuit, or upon exposure to a temperature above the maximum operating temperature, creates a risk of explosion. Indeed, such situations cause electrochemistry reactions which generate gases in the container of the accumulator. Accumulation of these gases causes an increase in the internal pressure of the accumulator, which may lead to violent bursting of the container and to the projection of noxious and corrosive chemical compounds for the environment and persons located nearby.

Safety devices exist, which avoid accumulation of gases inside the container of a sealed accumulator and allow their discharge when the internal pressure exceeds a predetermined value. Some of these devices also have the function of a circuit breaker, i.e. they are also capable of electrically and irreversibly insulating appliances connected to the accumulator.

Document FR-A-2 873 495 describes an accumulator comprising a safety device combining the function of a safety valve and that of a circuit breaker. A longitudinal section view of this accumulator is illustrated in FIG. 1.

The accumulator (1) comprises an alternation of positive and negative electrodes respectively connected to current output terminals (6, 7). The electrodes are positioned in a container (2) having a cylindrical side wall obturated at one of its ends by a bottom (3) and at the opposite end (4) by a lid (5). The bottom is formed with three portions: a peripheral portion (3a) electrically connected to the side wall, a cap (3c) and a thinned portion (3b) connecting the cap to the peripheral portion. A first planar connection (11) connects the positive electrode of the electrochemical bundle (9) to the wall of the bottom of the container, the wall of the bottom of the container being electrically conducting with the lid. On this lid, is welded the positive current output terminal (6). A second planar connection (12) connects the negative electrode of the bundle to the negative current output terminal (7). The negative current output terminal passes through the lid. A gasket (8) electrically insulates the negative current output terminal from the lid. A ring-shaped gasket (14) is placed between the electrochemical bundle and the bottom of the container. It is used as an electric insulator in order to prevent electric contact between the section of a negative electrode of the bundle and the wall of the container connected to the positive terminal, which would cause a short circuit after activation of the safety device. Tearing of the thinned portion is suitable for interrupting electric conduction between the electrodes of one polarity and their associated current output terminal by disconnecting the cap from the peripheral portion. The bundle is supported on the connection part (11) located in the bottom of the container. Upon overpressure, the thinned portion tears and the bundle supported on the cap by means of the connection part move towards the bottom of the container tearing the totality of the thinned portion in order to ensure electric cut-off between the positive electrode of the electrochemical bundle and the lid of the container.

Now, the container of the accumulator may not reliably fulfill its role of circuit breaker. Indeed, the tearing of the thinned portion may be partial, in which case an electric current may flow through the non-torn thinned portion. As the non-torn thinned portion is in electric contact with the cylindrical side wall of the container, an electric current may flow through the cylindrical side wall as far as the lid which supports the current output terminals. Now, one of the current output terminals is in electric contact with the lid. It is therefore possible that the electric consumer continues to be supplied with current in spite of the tearing of the thinned portion. In this case it is therefore not totally electrically insulated from the accumulator. An accumulator is therefore sought, comprising a safety device reliably ensuring its circuit breaker function.

SUMMARY OF THE INVENTION

For this purpose, the present invention proposes, as illustrated in FIG. 2A, a sealed accumulator container (2) intended to contain an electrochemical bundle (9), the container comprising a wall forming a bottom (3) in an electrically conducting material comprising:
 a peripheral portion (3a),
 a cap (3c),
 an embrittled portion (3b) delimiting the cap, joining the peripheral portion to the cap, adapted so as to break during over pressure inside the container,
 in which container is positioned an electrically conducting deformable membrane (10) electrically connecting electrodes of a same polarity of an electrochemical bundle to the cap,
 and in which container, overpressure causes deformation of the membrane, this deformation causing failure of the embrittled portion.

According to an embodiment, a connecting part (11) is positioned inside the container. It electrically connects the electrodes of same polarity of the electrochemical bundle to the deformable membrane.

According to an embodiment, the deformable membrane (10) has the shape of a disc and has a central portion (10b) and a peripheral portion (10a), the limit between the central portion and the peripheral portion substantially coinciding with the embrittled portion (3b), the peripheral portion (10a) of the deformable membrane substantially coinciding with the peripheral portion (3a) of the bottom of the container.

According to an embodiment, the deformable membrane comprises a central portion (10b) positioned in contact with the cap and a peripheral portion (10a) electrically insulated from the connecting part (11) and the cap (3).

According to an embodiment, the deformable membrane (10) and/or the connecting part (11) are in aluminum.

According to an embodiment, the deformable membrane (10) has a thickness comprised between 100 and 400 microns.

According to an embodiment, the deformable membrane (10) is not openworked.

According to an embodiment, the deformable membrane (10) maintains the container (2) hermetically sealed after failure of the embrittled portion (3b).

According to an embodiment, the deformable membrane (10) comprises at least one embrittled portion (10c) capable of tearing in the case of overpressure inside the container, for example for an overpressure of about 15 bars.

According to an embodiment, the peripheral portion (10a) of the deformable membrane is covered with a sheath of electrically insulating material (13).

According to an embodiment, the connecting part (11) comprises a connection portion (11a) in contact with the electrochemical bundle (9) and a central portion (11b) in contact with the deformable membrane (10).

According to an embodiment, the connecting part comprises a group of identical flexible spiral-shaped lamellas (11c) regularly distributed and connecting the central portion (11b) to the connecting portion (11a).

According to an embodiment, the embrittled portion (3b) has a smaller thickness than those of the cap (3c) and of the peripheral portion (3a).

The presence of the deformable membrane has the effect of retaining the gases emitted by internal electrochemical reactions of the accumulator. It forces the gases to exert their pressure on the cap until it is completely torn.

The invention also proposes a sealed accumulator (1) comprising:
the container (2) as described above,
an electrochemical bundle (9),
wherein failure of the embrittled portion (3b) of the wall of the bottom of the container is suitable for interrupting electric conduction passing through the cap (3c) between the deformable membrane (10) and a current output terminal.

According to an embodiment, the accumulator is of the lithium-ion type.

The object of the invention is also a method for making an electric connection comprising the following steps:
a) making an electrochemical bundle (9) available, comprising at least one positive electrode and at least one negative electrode separated by a separator;
b) electrically connecting an electrically conducting deformable membrane (10) with the electrodes of a same polarity of the electrochemical bundle;
c) making a container (2) available comprising a wall forming a bottom (3) in an electrically conducting material comprising:
a peripheral portion (3a),
a cap (3c),
an embrittled portion (3b) delimiting the cap, joining the peripheral portion to the cap, adapted so as to break upon overpressure inside the container,
d) introducing into the container (2) the electrochemical bundle and the deformable membrane so that the membrane is in contact with the cap.

According to an embodiment, step b) comprises the two following sub-steps:
i) electrically connecting a connecting part (11), other than an electrically conducting deformable membrane, onto the electrodes of same polarity of the electrochemical bundle (9); and
ii) electrically connecting the electrically conducting deformable membrane (10) onto the connecting part.

According to an embodiment, between steps i) and ii), an electrically insulating plastic film is wound around the electrochemical bundle while leaving free at least one portion of the connecting part.

According to an embodiment, the plastic film is a polyimide film.

According to an embodiment, the method comprises after step d), a step for laser welding the cap with the deformable membrane.

According to an embodiment, the method comprises after step d), a step for laser welding the cap with the deformable membrane and the connecting part.

SHORT DESCRIPTION OF THE FIGURES

Other features and advantages of the invention will become apparent upon reading the following description, given as an example and with reference to the figures which show:

FIG. 1 is a longitudinal sectional view of an accumulator including a safety device according to the prior art.

FIGS. 2A and 2B are longitudinal sectional views of the bottom of the container according to the invention. FIG. 2A illustrates the bottom of the container under rated operating conditions of the accumulator. FIG. 2B illustrates the bottom of the container after failure of the thinned portion and detachment of the cap from the bottom of the container.

FIG. 3 illustrates a top view of the deformable membrane.

FIGS. 4A-4E are examples of sections along the axis A-A' of the deformable membrane.

FIG. 5 illustrates a cross-section of the deformable membrane showing the cladding of the peripheral portion with an electrically insulating sheath.

Figure 6A:
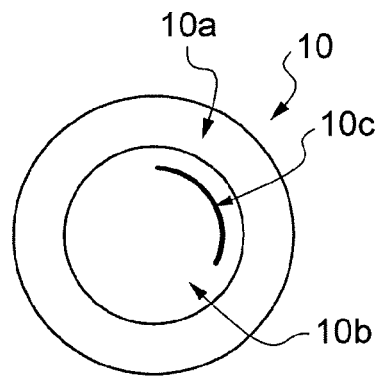
Figure 6B:
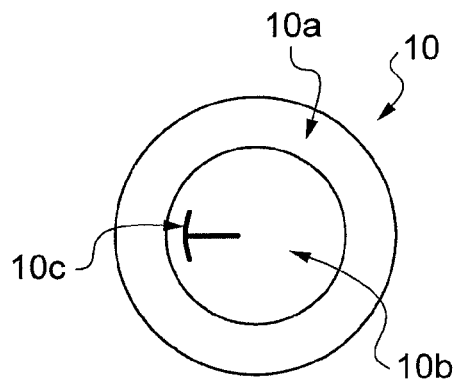
Figure 6C:
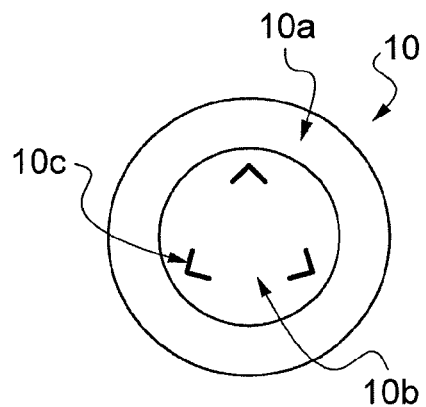

FIG. 6A-6C illustrate top views of the disc-shaped deformable membrane, the surface of which shows examples of shapes of embrittled portions which are:
  FIG. 6A, a thinned portion as a circular arc, extending over about one third of the circumference of the disc;
  FIG. 6B, a thinned portion as a circular arc intersecting a segment located on a radius of the disc;
  FIG. 6C, three thinned areas with the shape of a set square.

Figure 7A:
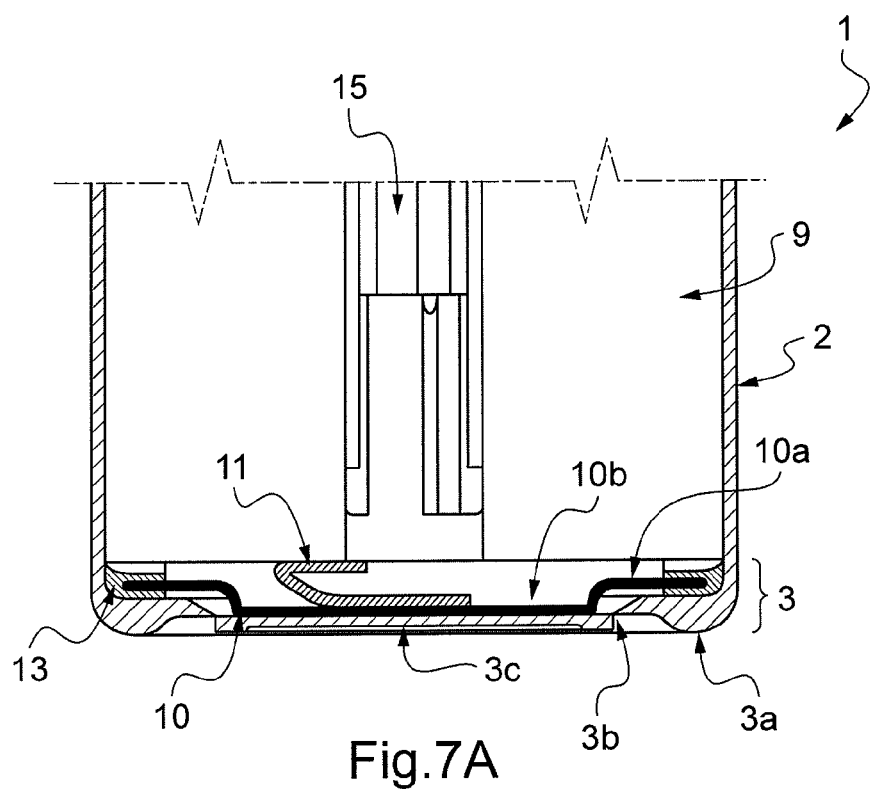
Figure 7B:
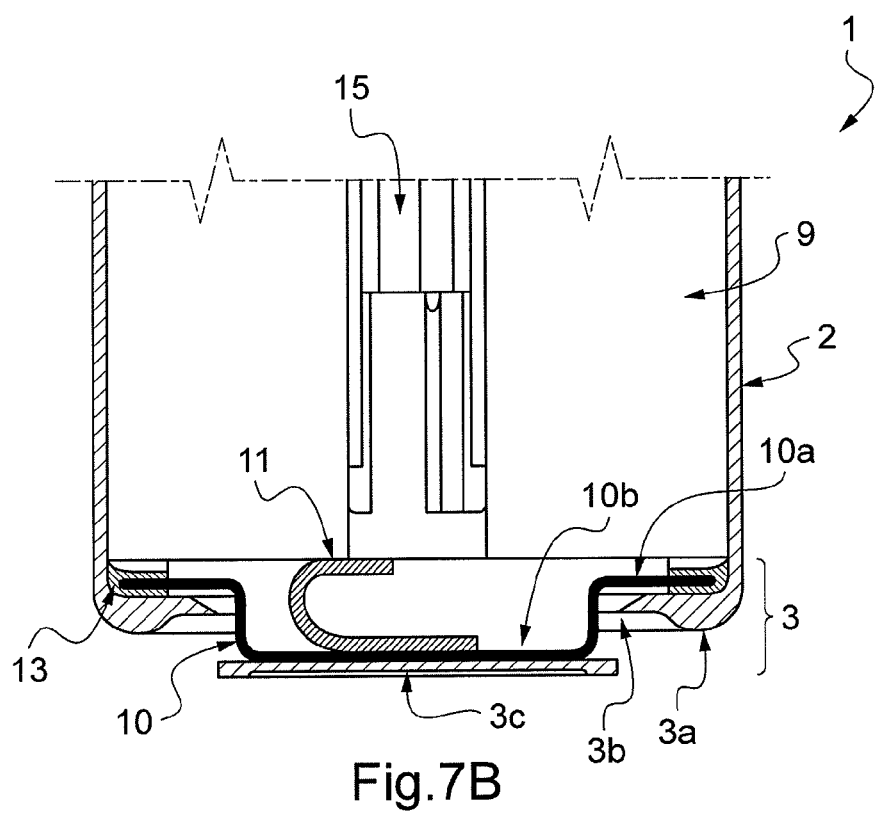

FIGS. 7A and 7B are longitudinal sectional views of the bottom of the container wherein the connecting part is a U-shaped metal tab. FIG. 7A illustrates the bottom of the container under rated operating conditions of the accumulator. FIG. 7B illustrates the bottom of the container after failure of the thinned portion and detachment of the cap from the bottom of the container.

Figure 8A:
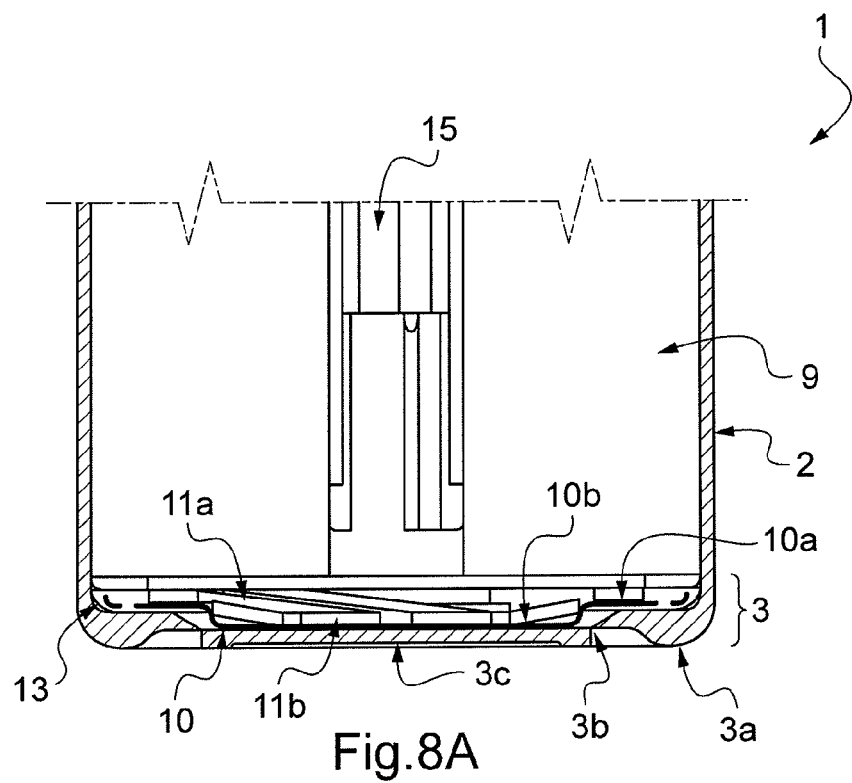
Figure 8B:
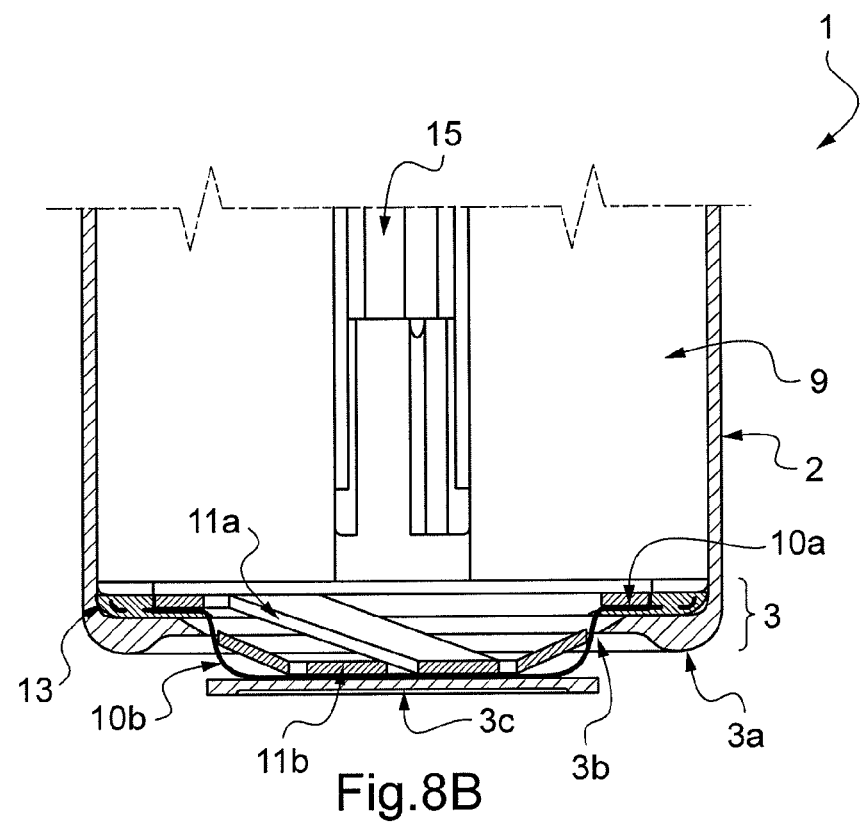

FIGS. 8A and 8B are longitudinal sectional views of the bottom of the container wherein the connecting part comprises a connecting portion intended to be electrically connected to the electrochemical bundle and a central portion in electric contact with the cap via the deformable membrane, the flexible connecting part comprising a group of regularly distributed identical flexible spiral-shaped lamellas and connecting the central portion to the connecting portion. FIG. 8A illustrates the bottom of the container under rated operating conditions. FIG. 8B illustrates the bottom of the container after failure of the thinned portion and detachment of the cap from the bottom of the container.

Figure 9A:
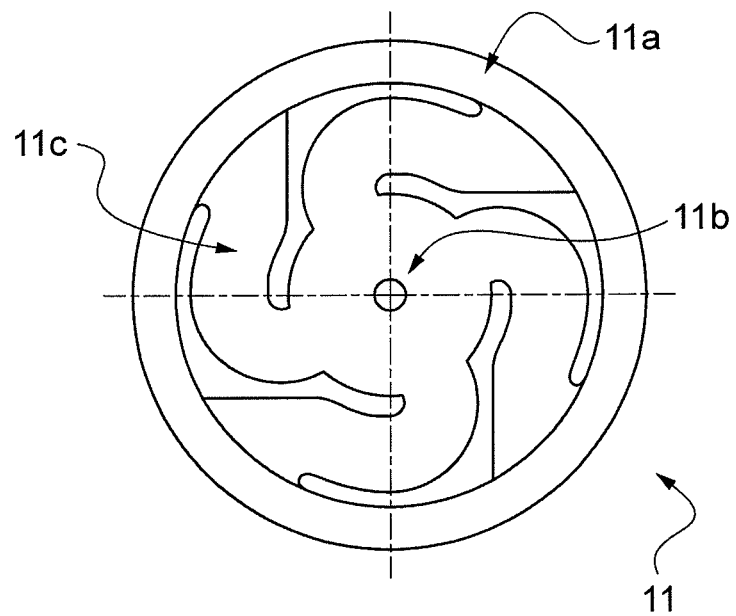
Figure 9B:
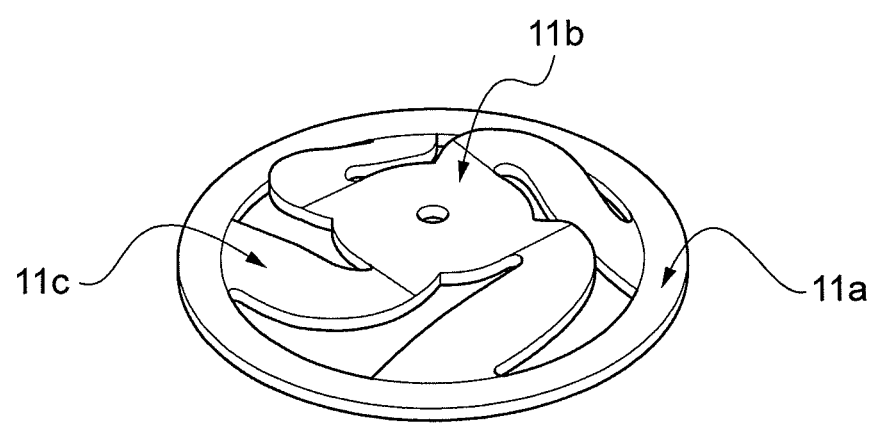

FIGS. 9A and 9B respectively illustrate a top view and a perspective view of the connecting part used in the embodiment illustrated in FIGS. 8A and 8B.

DISCUSSION OF THE EMBODIMENTS

In the various embodiments described hereafter, the format of the container is cylindrical but it is understood that the invention applies to other formats of containers such as the parallepipedal (or prismatic) formats.

Figure 2A:
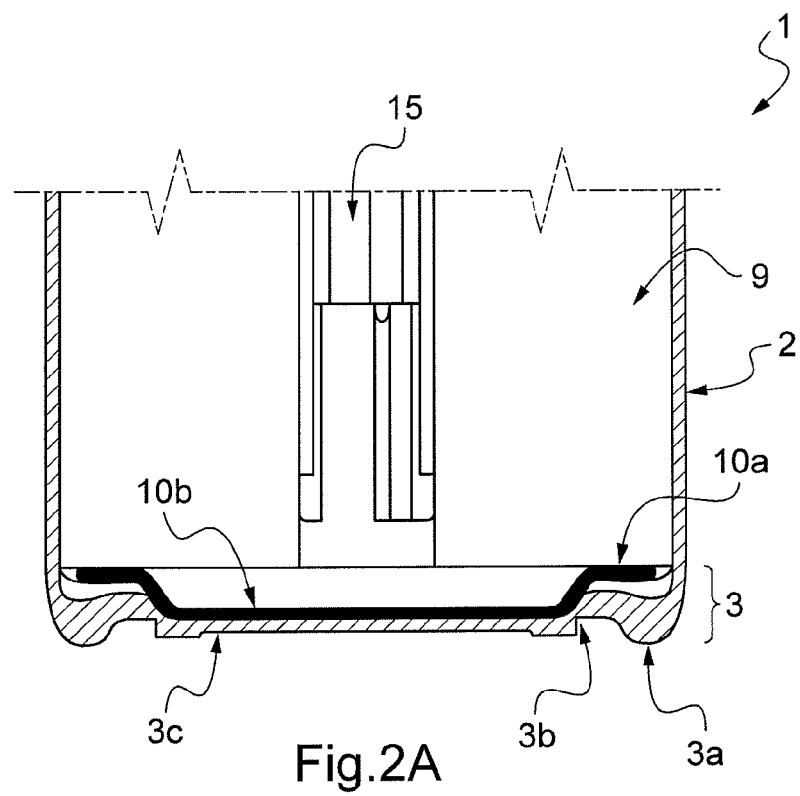
Figure 2B:
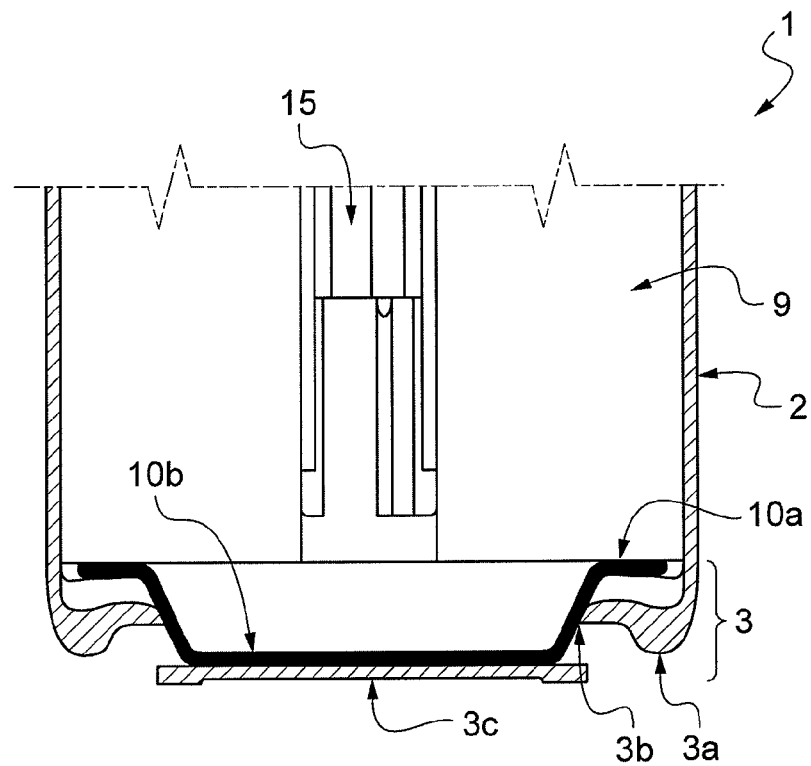

A first embodiment is illustrated in FIGS. 2A and 2B.

The accumulator (1) comprises a container having a side wall (2), obturated with a bottom (3) at one of its ends. A lid (not shown) is placed on the open end and hermetically seals the container. The lid supports positive and negative current output terminals (not shown). One of the current output terminals is welded on the lid. The other current output terminal passes through the lid. It is attached on the latter by any means such as screwing or crimping. A gasket electrically insulates the current output terminal passing through the lid.

The wall of the bottom of the container comprises a peripheral portion (3a) electrically connected to the side wall, a cap (3c) and an embrittled portion (3b) around the cap joining the cap to the peripheral portion. The embrittled portion may be a portion with a smaller thickness than that of the cap and of the peripheral portion. The peripheral portion is electrically connected to the side wall. The side wall and the portions forming the bottom are in an electrically conducting material. An electrochemical bundle (9) comprising an alternation of positive and negative electrodes separated by a separator is positioned in the container around a hollow axis (15) which is used as a gas chimney.

The electrically conducting deformable membrane will now be described in the particular case of a container with a cylindrical format.

FIG. 3 illustrates a top view of the deformable membrane. The latter has the shape of a disc comprising a central portion (10b) and a peripheral portion (10a). FIGS. 4A-4E are examples of sections along the axis A-A' of the deformable membrane. They show the different shapes which the cross-section may assume.

In FIG. 2A, it may be noted on the one hand that the limit between the central portion (10b) and the peripheral portion (10a) of the deformable membrane substantially coincides with the embrittled portion (3b) of the wall of the bottom of the container and on the other hand that the peripheral portion (10a) of the membrane substantially coincides with the peripheral portion (3a) of the wall of the bottom of the container. The central portion (10b) is in electric contact with electrodes of same polarity of the electrochemical bundle. This electric contact may be obtained by welding the membrane with the surface of the ends of the sheets of these electrodes, not covered with active material.

The deformable membrane is made in an electrically conducting material so as to allow conduction of the current between the electrodes and the cap. Aluminium is preferred since it is a material having low electric resistivity and having low mechanical strength. The connecting part may be in 1050 or 1100 aluminium. Preferably, aluminium is also used as a material for the connecting part and as a material for the container. The thickness of the deformable membrane is generally comprised between 100 and 400 microns. With such a thickness it is possible to let through a current with an intensity of more than 50 A. The accumulator is therefore well adapted for applications requiring high power.

The operation of the accumulator will now be described in the case of an increase in the internal pressure. The overpressure of the gases inside the container, in the case of a malfunction of the accumulator, generates on the cap a thrust force directed towards the outside of the container. The thrust force causes failure of the embrittled portion. The embrittled portion, which may be a thinned portion, is actually designed so as to break, i.e. to tear. The cap is then no longer electrically connected to the peripheral portion of the bottom of the container. Conduction of the current between the deformable membrane and the current output terminal is broken. With the failure of the embrittled portion, it is therefore possible to interrupt electric conduction between the electrodes of one polarity and the current output terminal of corresponding polarity, on the one hand and prevent continuation of the increase in pressure inside the container on the other hand. It therefore acts as a safety valve. The thickness of the thinned portion may be adjusted depending on the sought opening pressure and mechanical strength of the container. The material of the container is preferably in aluminium. Nickel-plated steel and copper may also be used.

Depending on the thickness of the thinned portion, an opening pressure comprised between 4 and 20 bars is obtained. Preferably, a thickness of the thinned portion will be selected so that the opening pressure is comprised between 8 to 12 bars. The non-deformed peripheral portion of the bottom of the container prevents ejection of the electrochemical bundle in the case of tearing of the thinned portion.

The presence of the deformable membrane has the effect of retaining the gases emitted by the electrochemical reactions inside the container. It forces these gases to exert pressure on the cap until it is completely torn. In the absence of a membrane, as soon as the cap is opened, the gases will discharge out of the container of the accumulator and the pressure on the cap will drop, which would not allow complete opening of the cap. With the deformable membrane, it is therefore possible to maintain the container hermetically sealed after tearing of the cap.

The surface of the deformable membrane may comprise embrittled portions (10c), for example as a thinned portion which may assume various shapes, as this is illustrated in FIGS. 6A-6C. The thickness of the thinned portion is calculated so as to cause tearing of the thinned portion when the pressure inside the container of the accumulator exceeds a predetermined threshold value, for example 15 bars.

Advantageously, the container may contain an electrically insulating ring mounted on the peripheral portion of the wall of the bottom of the container. This ring is intended to support the electrochemical bundle. It is used as an electric insulator in order to prevent electric contact between a section of an electrode of the bundle and the wall of the container connected to an electrode of inverse polarity, which may cause an internal short circuit after opening the cap. The electrochemical bundle is not supported on the cap, but only on the peripheral portion by means of the insulating ring. Accordingly, as a result of impacts, the weight of the bundle does not exert any force on the cap and therefore does not cause failure of the embrittled portion.

In both embodiments described hereafter, a connecting part is used. It is positioned between the end of the electrodes of a same polarity located at the bottom of the container and the deformable membrane.

FIGS. 7A and 7B are longitudinal sectional views of the bottom of the container of an accumulator according to a second embodiment of the invention wherein the connecting part is a flexible U-shaped metal lamella. One of the branches of the U is electrically connected to the sheet of the electrodes of same polarity jutting out from one end of the electrochemical bundle. The other branch of the U is electrically connected to the electrically conducting deformable membrane (10), itself in electric contact with the cap.

The deformable membrane is sandwiched between the connecting part and the cap. Preferably, the contact point between the connecting part, the deformable membrane as well as the contact point between the deformable membrane and the cap are welded. The welding of the connecting part with the deformable membrane and the cap may be carried out with a laser directed onto the outer wall of the bottom of the container.

According to a third embodiment, illustrated in FIGS. 8A and 8B, the connecting part is flexible and comprises:
- a connecting portion (11a) intended to be electrically connected to the sheet of the electrodes jutting out from an end of the electrochemical bundle,
- a central portion (11b) intended to be attached to the deformable membrane and
- identical flexible lamellas (11c) connecting the central portion to the connecting portion.

By a flexible part is meant a part which deforms when the overpressure pushes the cap outwards, the connecting part being firmly secured to the cap.

The lamellas are spiral-shaped, i.e. they have a curved shape which gradually moves away from the central portion (11b). The lamellas are regularly distributed around the central portion (11b). The lamellas may be spiral-shaped turning to the right or to the left. In FIGS. 9A and 9B, the lamellas turn to the right. They are 4 in number substantially forming a cross with the shape of a swastika. The number of fins may be greater than 4 or 3 in number. By having fins of this shape, it is possible to make the central portion mobile relatively to the connecting portion by displacing the central portion according to a helicoidal movement, the axis of which passes through the center of the central portion. This movement of the central portion is due to the fact that the fins are spiral-shaped and that they bend. Thus, during the helicoidal movement, the fins deform while bending, being deployed (i.e. become less and less curved).

By means of the helicoidal movement performed by the connecting part, the cap after tearing of the thinned portion is found in a position substantially parallel to its position before failure of the thinned portion. The cap is guided during the tearing of the embrittled portion. By the helicoidal guiding movement performed by the connecting part on the cap, failure of the embrittled portion around the cap is totally effected. Accordingly, the cap is surely disconnected from the peripheral portion. With this, it is possible to ensure that the cap is no longer in contact with the peripheral portion. Therefore, this third embodiment as compared with the one in which the connecting part is a metal tab (FIGS. 7A and 7B), provides a better guarantee of electric disconnection between the electrodes of one polarity and the associated current output terminal.

In the embodiments illustrates in FIGS. 7A, 7B, 8A and 8B, the peripheral portion (10a) of the deformable membrane is electrically insulated from the electrodes and from the cap (3c). This electric insulation may be obtained in a first step by winding an insulating plastic film around the electrochemical bundle while leaving free the portion of the electrodes which have to be connected to the deformable membrane and placing the deformable membrane so that its peripheral portion is supported on the insulating plastic film, and then in a second step by covering the peripheral portion of the deformable membrane with an insulating plastic film. The electric insulation of the peripheral portion of the membrane may also be obtained by making a sheath (13) of an electrically insulating material around the peripheral portion (10a) of the membrane. This electrically insulating material may be overmolded, laminated or stuck to the membrane. The cladding with an insulating material is illustrated in FIG. 5. The insulating material may be selected from polyetherimide, polypropylene and polyethylene.

A possible manufacturing method of the accumulator according to the invention is now described. This description in particular refers to the method for manufacturing a cylindrical accumulator of the lithium-ion type but it is understood that the invention also relates to other technologies of accumulators, as well as to any container format such as the rectangular format.

The electrochemical bundle is made by superposing at least one electrode, at least one separator and at least one negative electrode. The positive electrode consists of a current collector which may be an aluminium sheet, covered with an active material consisting of a lithiated oxide of transition metals such as $LiCoO_2$, $LiNiO_2$, $LiMnO_2$, $LiMn_2O_4$, or a phosphate material of the $LiMPO_4$ type (with M=Mn, Fe or as a mixture) or a mixture thereof.

The negative electrode consists of a current collector which may be a copper sheet, covered with an active material consisting of a material capable of reversibly inserting lithium such as graphite, coke, glassy carbon and carbon black.

The separator may be in a polyolefin.

The electrochemical bundle is wound around a hollow axis which is used as a chimney for letting through gases. At each of the ends of the electrochemical bundle, the surface portion of the sheets of the positive and negative electrodes not covered with active material, juts out. The deformable membrane is welded at the end intended to be positioned in the bottom of the container. Next, preferably an insulating plastic film for example of polyimide (Kapton®) is wound around the electrochemical bundle and the deformable membrane while leaving free at least one portion of the surface of the deformable membrane. This film allows electrical insulation of the electrochemical bundle from the wall of the container. Any risk of short circuit with the side wall of the container is thereby avoided.

A connecting part allowing conduction of the current of the electrodes towards the corresponding current output terminal is attached on the electrodes jutting out from the end of the electrochemical bundle, intended to be placed on the side of the lid. The electrochemical bundle provided at one of its ends with the deformable membrane and at the other end with the connecting part is introduced into the container. The end of the electrochemical bundle provided with the deformable membrane is first introduced into the container.

An embrittlement area of the wall of the bottom of the container will have been made beforehand for example by generating thinning of a portion of the wall of the bottom of the container by stamping the material of the container by means of a press.

The impregnation of the electrodes and of the separators as well as the thinning of the container with the electrolyte is carried out with an air depression in the container. The electrolyte consists of a lithium salt dissolved in an organic solvent. The container is sealably closed by welding a lid provided with current output terminals, on the open end of the container.

In the second and third embodiments described above, a connecting part is attached to the electrodes of a same polarity before attaching the deformable membrane. The method may then comprise the following steps:
a) making the electrochemical bundle available;
b) attaching the connecting part onto the electrochemical bundle;
c) optionally winding an insulating plastic film around the electrochemical bundle while leaving free at least one portion of the connecting part;
d) attaching the deformable membrane onto the portion of the connecting part left free;

e) introducing the electrochemical bundle provided with the connecting part, the plastic film and the deformable membrane, into the container.

In a preferred embodiment, the contact point between the connecting part and the deformable membrane as well as the contact point between the deformable membrane and the cap are welded transparently by means of a laser. This may be achieved even after having introduced the electrochemical bundle into the container. The laser beam is directed on the external wall of the container. The result is a weld between the deformable membrane and the cap and optionally the connecting part, if it is used.

The invention claimed is:

1. A sealed accumulator container intended to contain an electrochemical bundle, the container comprising a wall forming a bottom in an electrically conducting material, comprising:
   a peripheral portion,
   a cap,
   an embrittled portion, delimiting the cap, joining the peripheral portion to the cap, adapted so as to break upon overpressure inside the container,
   in which container is positioned:
      a not openworked electrically conducting deformable membrane electrically connecting electrodes of a same polarity of an electrochemical bundle to the cap,
      a connecting part distinct from the not openworked electrically conducting deformable membrane, which electrically connects the electrodes of same polarity of the electrochemical bundle to the deformable membrane,
   in which container, an overpressure causes deformation of the membrane, this deformation causing failure of the embrittled portion, and wherein the not openworked electrically conducting deformable membrane maintains the container hermetically sealed after failure of the embrittled portion.

2. The container according to claim 1, wherein the deformable membrane has the shape of a disc and has a central portion and a peripheral portion, the limit between the central portion and the peripheral portion substantially coinciding with the embrittled portion, the peripheral portion of the deformable membrane substantially coinciding with the peripheral portion of the bottom of the container.

3. The container according to claim 1, wherein the deformable membrane comprises a central portion positioned in contact with the cap and a peripheral portion, electrically insulated from the connecting part and from the cap.

4. The container according to claim 1, wherein the deformable membrane and/or the connecting part are in aluminium.

5. The container according to claim 1, wherein the deformable membrane has a thickness comprised between 100 and 400 microns.

6. The container according to claim 1, wherein the deformable membrane comprises at least one embrittled portion capable of tearing in the case of overpressure inside the container, for example for an overpressure of about 15 bars.

7. The container according to claim 2, wherein the peripheral portion of the deformable membrane is covered with a sheath of an electrically insulating material.

8. The container according to claim 1, wherein the connecting part comprises a connecting portion in contact with the electrochemical bundle and a central portion in contact with the deformable membrane.

9. The container according to claim 8, wherein the connecting part comprises a bundle of identical flexible spiral-shaped lamellas, regularly distributed and connecting the central portion to the connecting portion.

10. The container according to claim 1, wherein the embrittled portion has a smaller thickness than those of the cap and of the peripheral portion.

11. A sealed accumulator comprising:
    the container according to claim 1,
    an electrochemical bundle,
    wherein failure of the embrittled portion of the wall of the bottom of the container is adapted for interrupting electric conduction via the cap between the deformable membrane and a current output terminal.

12. The accumulator according to claim 11, of the lithium-ion type.

13. A method for making an electric connection comprising the following steps:
    a) making an electrochemical bundle available comprising at least one positive electrode and at least one negative electrode separated by a separator;
    b) electrically connecting a not openworked electrically conducting deformable membrane with the electrodes of same polarity of the electrochemical bundle by performing the two following sub-steps;
       b)i) electrically connecting a connecting part, other than an electrically conducting deformable membrane, onto the electrodes of same polarity of the electrochemical bundle; and then
       b)ii) electrically connecting the electrically conducting deformable membrane onto the connecting part; and wherein the not openworked electrically conducting deformable membrane maintains the container hermetically sealed in case of failure of the embrittled portion;
    c) making available a container comprising a wall forming a bottom in an electrically conducting material comprising:
       a peripheral portion,
       a cap,
       an embrittled portion delimiting the cap, joining the peripheral portion to the cap, adapted so as to break upon overpressure inside the container; and
    d) introducing into the container the electrochemical bundle and the deformable membrane so that the membrane is in contact with the cap.

14. The method according to claim 13, wherein between steps b)i) and b)ii), an electric insulating plastic film is wound around the electrochemical bundle while leaving free at least one portion of the connecting part.

15. The method according to claim 14, wherein the plastic film is a polyimide film.

16. The method according to claim 13, comprising after step d), a step for laser welding of the cap with the deformable membrane.

17. The method according to claim 13, comprising after step d), a step for laser welding the cap with the deformable membrane and the connecting part.

* * * * *